Sept. 30, 1958 H. F. MATARÉ 2,854,365

POTENTIAL GRADED SEMI-CONDUCTOR AND METHOD OF MAKING THE SAME

Filed March 16, 1956 2 Sheets-Sheet 1

INVENTOR
Herbert F. Mataré
BY
Eyre Mann & Burrows
ATTORNEYS

INVENTOR
Herbert F. Mataré
BY
Eyre Mann & Burrows
ATTORNEYS

United States Patent Office 2,854,365
Patented Sept. 30, 1958

2,854,365

POTENTIAL GRADED SEMI-CONDUCTOR AND METHOD OF MAKING THE SAME

Herbert F. Mataré, West End, N. J., assignor to Tung-Sol Electric Inc., a corporation of Delaware Application March 16, 1956, Serial No. 572,143

9 Claims. (Cl. 148—1.5)

The present invention relates to semi-conductor devices such as crystal diodes, transistors and the like and comprises a novel method of constructing such devices which is simpler to practice than methods heretofore in use and that results in a more predictable and stable device. The invention includes also novel semi-conductor devices produced in accordance with the new method.

In the usual semi-conductor having a p–n junction, there is a highly sensitive surface region or zone which extends, in the case of "formed" point contact rectifiers, around the contact electrode and, in the junction type, around the alloy material at the slab or squared semi-conductor crystal with the grown junction interface. This highly sensitive zone is where the inversion layer between the n- and p-type materials comes to the surface of the crystal. The field strength is highest at this interface and when polarized in the reverse direction tends to attract water vapor and other impurities. To avoid contamination, present processes involve surface etching, either chemically or electrolytically, of this part of the crystal followed by impregnation to protect the etched surface against further contamination. The etching and impregnation of these small zones require skilled technique and add substantially to the cost of manufacture. The method of the present invention avoids the necessity for etching and impregnating these highly sensitive zones of the usual semi-conductor by so forming the p–n junction that, where the inversion layer comes to the surface, the transition zone containing the inversion layer is wider and the potential gradient less, thus reducing the sensitivity of the area. In devices constructed according to the invention high resistance or intrinsic material is so associated with the p–n junction as to cause the inversion layer to transverse the high resistance material before coming to the surface of the crystal.

The method is essentially one of potential grading and involves the use of a superimposed layer of intrinsic material to diminish the potential drop across the inversion layer. The superimposed layer of intrinsic material can be formed in various ways. For example a crystal of the pure intrinsic material can be used as a seed to draw doped material, for example to draw n-type material, and thereby obtain a monocrystalline sandwich of intrinsic and n-type material. After forming a hole through the intrinsic material to or through the interface, the hole can be filled with the metal to be alloyed, for example, indium, and the usual temperature cycle applied. Alternatively, a layer or n- or p-type material can be diffused into an intrinsic monocrystal and the diffused layer thereafter used for the alloying operation.

For an understanding of the theory upon which the new method of preparing semi-conductor devices is predicated, of devices embodying the invention and of characteristics of the new device, reference may be had to the accompanying drawings of which:

Figure 1:
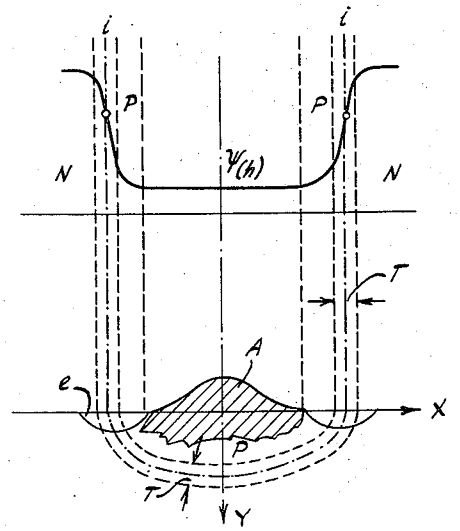
Fig. 1 is a diagram for use in explanation of the invention, the diagram showing the potential distribution for holes adjacent the interface of a p–n junction of prior art devices, and also a transverse section through the junction.

In Fig. 1 A represents the metal, for example, indium, used for alloying to the n-type base to form a p–n junction. The recrystallized zone comprising the p-type material is indicated by the letter P. Between the p-type material and the n-type base is a transition region T through the center of which is the inversion layer *i*. The surface of the n-type crystal is indicated by the direction line X. The transition layer T comes to the surface of the crystal in an annulus surrounding the metal A. As shown in the upper part of Fig. 1 the potential distribution for holes $\psi_h$ is such that there is a sharp potential gradient through the transition layer. Since high field strength $E=-\Delta\psi$ is established at this intersection of the transition layer with the surface of the crystal when polarized in the reverse direction there is a general tendency for water vapor and other polarizable impurities to be attached to this interface and there polarized. The usual practice is to etch away the sensitive area and form depressions *e*, followed by impregnation of the etched area.

Figure 2:
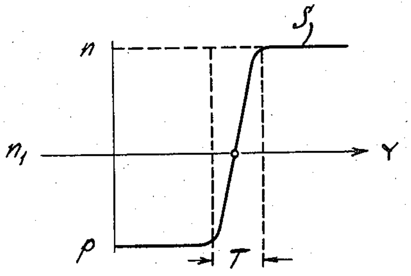
Fig. 2 is a graph showing the potential distribution across an interface of a p–n junction.

In Fig. 2 the potential drop across the transition zone is shown by the curve S, the transition area being indicated as in Fig. 1 by the letter T. The line indicated by the direction Y represents the plane which contains all points *i* where the n- and p-type impurities compensate and give the intrinsic resistivity (intrinsic free carrier density $n_i$).

Figure 3:
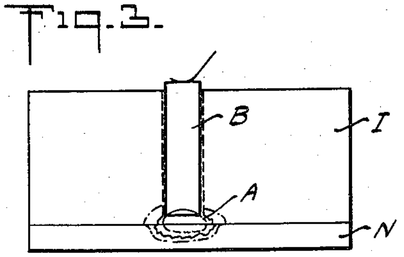
Fig. 3 is a schematic sectional view through a crystal diode embodying the invention.
Figure 4:
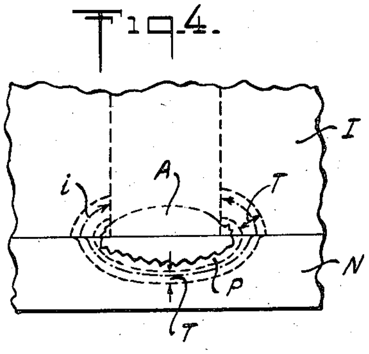
Fig. 4 is an enlarged schematic sectional view of the junction region of the device of Fig. 3.

Figs. 3 and 4 represent one manner in which the potential gradient at an interface can be decreased in accordance with the invention. The intrinsic material part of a monocrystal is indicated by I and the doped n-type part of the monocrystal is indicated by N. B represents any material of good conductivity or even a wire connection which is inserted through a hole drilled through the intrinsic material to the interface with the n-type material. A, as in Fig. 1, is indium or other metal used for alloying to the n-type material for formation of the p–n junction. The transition zone T, between the n-type material and the p-type material formed upon recrystallization after alloying of the metal A to the n-type material is the zone, shown in Fig. 4, between the dashed lines. The recrystallized zone P forms a semi-sphere around the metal A. At the interface where the crystal changes abruptly from n-type doped with a normal impurity density *n* between $10^{15}$ to $10^{17}$ cm.$^{-3}$, the inversion layer *i*, indicated by the dot and dash line, shows a discontinuity. This is due to the fact that the transition zone is wider in the intrinsic material than in the doped material. This discontinuity in the inversion layer at the interface causes the layer to cross a larger distance through high resistivity material before coming up to the surface at the locations indicated by the arrow heads on the inversion layer $i$. As the wider transition zone insures a less steep potential change, the surface area will be less affected by the accumulation of electrolytic impurities.

Figure 5:
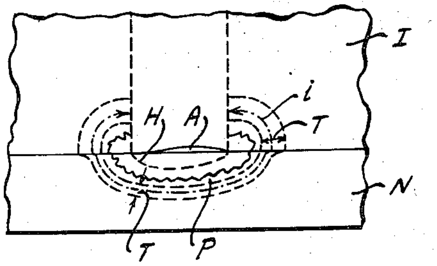
Fig. 5 is a schematic fragmentary sectional view similar to Fig. 4 but representing a modification of the device of Figs. 3 and 4.

Fig. 5 illustrates the junction part of a diode similar to that of Figs. 3 and 4 except that a semi-spherical hole H is etched or drilled into the n-type material before the dot of indium or other material is alloyed to the crystal. This construction results in an exposed transition zone even less apt to be affected by accumulation of impurities than when the dot is alloyed to the plane surface of the n-type material as in Figs. 3 and 4.

Figure 6:
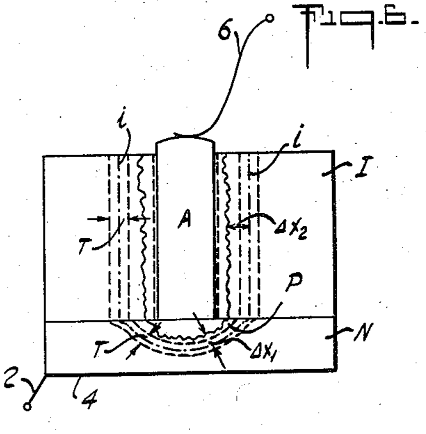
Fig. 6 is a view, similar to Fig. 3, of a device representing another embodiment of the invention.

Fig. 6 represents still another method whereby the potential at the surface is graded. Starting with an I–N crystal block, a metal pellet, for example, indium, can be alloyed through the intrinsic layer by temperature gradient zone melting. The eutectic temperature of the metal pellet and of the material of the intrinsic crystal layer, for example, indium and intrinsic germanium, respectively, is maintained at the upper surface of the bicrystal and a slightly higher temperature is maintained at the lower surface to cause the metal pellet to glide through the intrinsic layer leaving behind a p-type path (in the case of indium). (See W. G. Pfann: Temperature Gradient Zone Melting, Journal of Metals, Sect. 1, September 1955, p. 961.) By this method a pathway of highly doped, lower resistivity p-type material is left all through the intrinsic layer. Accordingly the transition zone containing the inversion layer is extended all around the cylindrical path of the metal through the intrinsic material. As in Figs. 3 through 5 the alloying metal is indicated by A, the transition zone by T, the inversion layer by $i$, the recrystallized zone by P and the n-type metal by N. The distance of the inversion layer from the p-type layer for the equally high dotation of the n–p type layer is indicated by $\Delta X_1$ and for p-type alloying towards only slightly doped n-type layer by the greater distance $\Delta X_2$. When used as a diode a conductor 2 may be attached in conventional manner to a metal plate 4 welded to the base of the n-type material and a conductor 6 may be connected to the metal A. An alternative method for producing a diode substantially like that of Fig. 5 is to fill a drilled channel through the intrinsic material with indium or other acceptor metal and then follow the normal alloying or heat cycling procedure to recrystallize p-type material all around the metal filling. In the normal alloying or temperature cycling process the semi-conductor metal combination, for example, of germanium and indium, is alternately heated to the eutectic temperature to cause alloying and cooled to cause recrystallization. (See page 175 "Transistor I" published by Radio Corporation of America, reporting on a paper presented at the Semi-Conductor Research Conference of the I. R. E., June 1954, in Minneapolis, Minn., by H. Nelson, entitled "A Silicon N–P–N Junction Transistor by the Alloy Process.")

Figure 7:
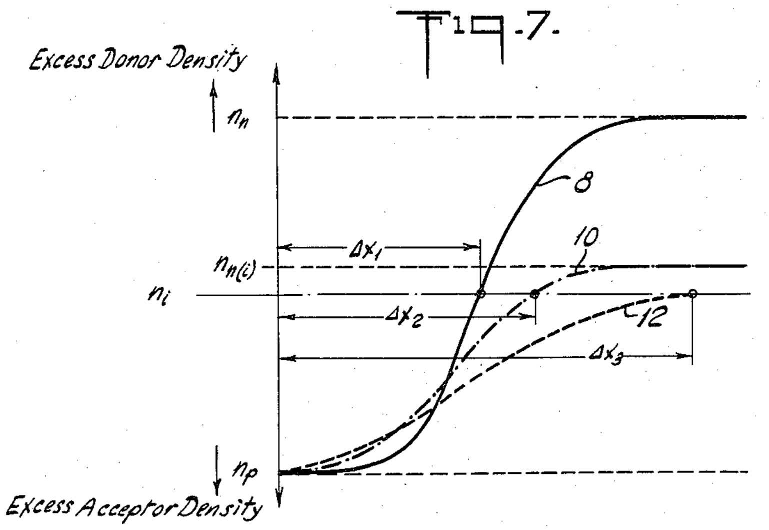
Figs. 7, 8 and 9 are graphs explanatory of the characteristics of the double base interfaces of the semi-conductor devices of the invention.
Figure 8:
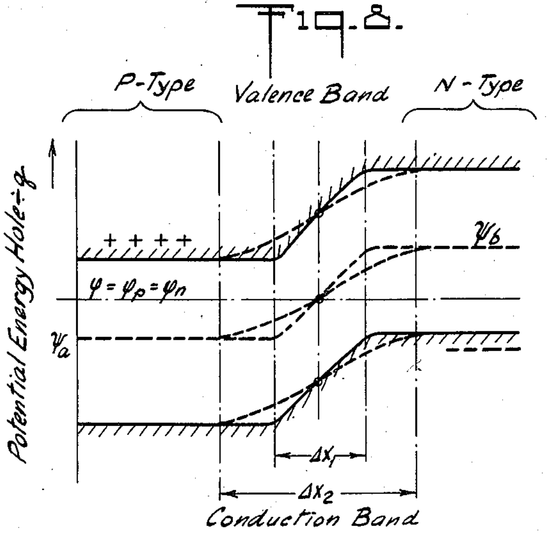
Figure 9:
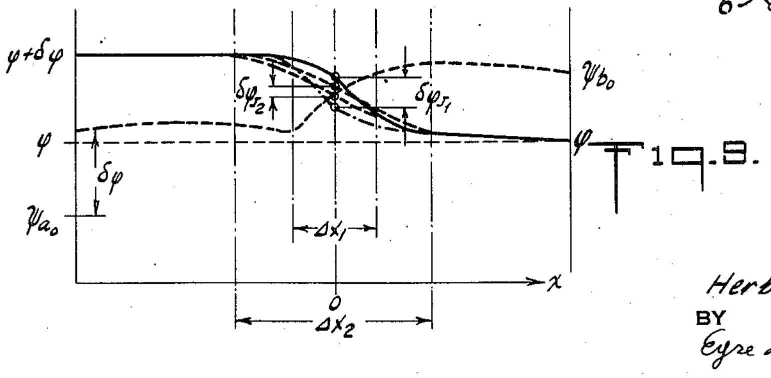

The graphs of Figs. 7, 8 and 9 show specific properties of the potential graded devices of Figs. 3, 4, 5 and 6.

In Fig. 7 the excess donor density $N_d - N_a$ is plotted for the different cases:

$$N_n = N_p$$
$$N_{n(i)} < N_p$$
$$N_{n(i)} << N_p$$

Curve 8 which crosses the inversion layer at the distance $\Delta X_1$ represents the potential distribution between equally high dotation of the n- and p-type layers $(N_n = N_p)$. Curve 10 which crosses the inversion layer at a distance $\Delta X_2$ represents the potential distribution for p-type alloying toward an only slightly doped n-type material $(N_{n(i)} < N_p)$. Curve 12 which crosses the inversion layer at a distance $\Delta X_3$ represents the potential distribution of the ideal case of p-type alloying toward intrinsic material $(N_{n(i)} << N_p)$.

The potential energy for holes per unit charge $q$ is plotted in Fig. 8 for the two cases $\Delta X_1$ and $\Delta X_2$, in other words for different widths of the transition regions, for the case of potential applied in the reverse direction. In Fig. 8 the line $\varphi = \varphi_p = \varphi_n$ represents the Fermi-Level for thermal equilibrium and the dashed line $\psi_n$, $\psi$ represents the level to which the quasi-Fermi-Level is shifted as the result of polarization. The decrease in slope of the potential curves at the boundaries of the conduction and valence bands and of the quasi-Fermi-Level for a transition zone of width $\Delta X_2$ as compared to a transition zone width of $\Delta X_1$ is apparent.

In Fig. 9 the potential energy for holes is plotted for the case of a potential applied in the forward direction. The bias potential $\delta\varphi$, shifts the Fermi-Level holes in the p-type layer to $\varphi + \delta\varphi$. An important effect of the different widths of the transition regions, indicated by $\Delta X_1$, $\Delta X_2$, is the difference $\delta\varphi J_1 - \delta\varphi J_2$ in the potential drop inside the inversion zone. The potential drop is smaller for the wider transition zone and therefore the potential drop will be less at the interface between the p-type material and intrinsic material than at the interface between the p-type and n-type materials.

Under polarization, the change in characteristic due to the double I–N interface is mainly given by the injection into the intrinsic material. At a normal P–N interface the ratio of the hole current, $I_p$, to electron current, $I_n$, across the transition region is:

$$I_p/I_n = (\sigma_p/\sigma_n)^{1/2}$$

where $$\sigma_n = e\mu_n n;\ \sigma_p = e\mu_p p$$

are the respective conductivities, $\mu_p$ and $\mu_n$ the respective mobilities, $n$ and $p$ the electron and hole respective densities and $e$ the electron charge. (See W. Shockley: the Bell System Technical Journal, vol. 28, July 1949, No. 3, p. 461.) Since $$I_p/I_n = (\rho_n/\rho_p)^{1/2}$$

where $\rho_n$ and $\rho_p$ are the respective resistivities, there is an appreciable injection not only into the n-type material but also into the intrinsic material. At negative bias, in the reverse direction, the injection is given by the relations:

$$I_n/I_p = (\rho_p/\rho_n)^{1/2}$$

and $$I_{n(i)}/I_p = (\rho_p/\rho_{n(i)})^{1/2}$$

which both are small since $$\rho_p << \rho_n << \rho_{n(i)}$$

Thus with the new potential graded devices of the invention the backward characteristic is changed hardly at all as compared to the ordinary junction while the forward characteristic is improved. Primarily, however, the improvement over the conventional junctions is in the increased stability resulting from the elimination of the etching procedure.

Figure 10:
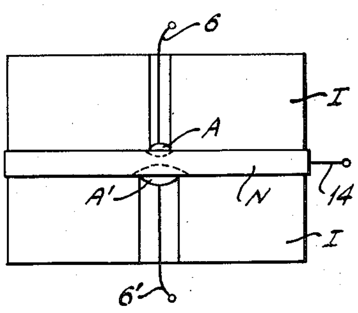
Fig. 10 is a diagrammatic representation of a transistor embodying the invention.

Although the invention has been so far described with reference to diodes the same procedure is applicable to transistors. Fig. 10 illustrates diagrammatically a schematic cross section through a triple crystal I–N–I. By drilling or diffusion through the two intrinsic layers two potential graded junctions between alloying metals A and A′ can be formed to provide a transistor, the same procedure as described in connection with Figs. 3 and 6 being equally applicable to the embodiment of the invention illustrated in Fig. 10. Contact to the n-type layer can be made all around the device by plating or soldering as indicated at 14. Connections to the two alloying metals are indicated by the reference numerals 6 and 6′. These, in the case where the method illustrated by Fig. 3 is employed, could be connections to any metal filling up the holes drilled in the intrinsic blocks or directly to the alloying metals whereas in the case of either of the processes disclosed in connection with Fig. 6 where the alloying metal fills the channel, the connections 6 and 6' could be to the outer surface of the alloying metals A and A' respectively.

The I–N or I–N–I crystals used in preparing the new potential graded diodes or triodes can be grown by known techniques. Starting with an intrinsic melt, a monocrystal is pulled. This crystal may then be used as a seed for another pulling operation with a doped ingot to yield the n-type part of the crystal. The n-type layer may be slightly thicker than the usual wafers to permit an indentation to be made such as that in the modification of the invention illustrated in Fig. 5. After formation of the I–N crystal a channel in the intrinsic material is drilled, for example, using an ultrasonic drilling device, and the indium or other metal to be alloyed placed in the channel and in the indentation in the n-type material where such indentation is employed. Temperature cycling is then applied as usual. In the case of the transistor the I–N crystal formed as above described may be used as a seed for another pulling operation with intrinsic material. In this case a still larger n-type layer is required because of the melt back of part of this layer in the pulling operation with the intrinsic material.

For purposes of explanation and illustration of the invention, the description has been confined to I–N or I–N–I crystals and the alloying of material such as indium to the interface or interfaces to form p-n junctions. Obviously the method of potential grading herein described is equally applicable to I–P or I–P–I crystals, and the alloying of material such as antimony thereto at the interface to form n-p junctions. Crystals of germanium, silicon or any other semi-conductor could be employed.

The invention has now been described with reference to various embodiments thereof and alternative methods of potential grading in accordance with the invention have been described.

The following is claimed:

1. The method of improving the stability of semi-conductor devices which comprises forming a crystal of intrinsic material and doped material of p- or n-type to provide an interface therebetween, removing some of the intrinsic material to expose a limited area of doped material and so forming a p-n junction at the exposed area that the transition zone between p- and n-type material is covered by the intrinsic material.

2. The method of forming a semi-conductor of improved stability which comprises forming a crystal of intrinsic material and doped material of p- or n-type to provide an interface therebetween, removing some of the intrinsic material at the interface to expose a limited area of the doped material, and alloying a metal of conductivity determining type opposite to that of the doped material to the exposed area to form, upon recrystallization, a semi-conductor junction.

3. The method according to claim 2 wherein the intrinsic material is removed by drilling a channel through the intrinsic material to the interface, and the metal to be alloyed with the doped material is inserted through the channel.

4. The method according to claim 3 wherein the intrinsic material is removed and the metal alloyed to the doped material by temperature gradient zone melting of a metal pellet through the intrinsic material to leave a pathway through the intrinsic material of a material doped with the opposite type of impurity than that with which the material of the original crystal is doped.

5. The method according to claim 2 wherein part of the doped material is removed to leave an indentation in the doped material into which the metal is alloyed.

6. The method according to claim 2 wherein the crystal is formed with intrinsic material on each side of the doped material and wherein two semi-conductor junctions are formed by alloying metal to a portion of the doped material at each interface with the intrinsic material.

7. A semi-conductor device comprising a crystal having a layer of doped material and at least one layer of intrinsic material, the interface between the intrinsic and doped materials being so interrupted by a p-n junction that the transition zone between the p and n type material is covered by the intrinsic material.

8. A semi-conductor device according to claim 7 wherein the crystal has a second intrinsic layer providing a second interface with the doped material and wherein said second interface is also so interrupted by a p-n junction that the transition zone between the p- and n-type material is covered by the intrinsic material.

9. A semi-conductor device comprising a crystal of intrinsic and n-type materials having a channel through the intrinsic material terminating at the interface with the n-type material, and a pellet of acceptor type material within the channel, alloyed to the n-type material and providing therewith a p-n junction, whereby at the interface between n-type material and intrinsic material there is a discontinuity in the inversion layer such as to reduce the potential drop across the transition zone where the inversion layer comes up to the free crystal surface.

References Cited in the file of this patent

UNITED STATES PATENTS 2,705,767 Hall ------------------- Apr. 5, 1955